US010186704B2

(12) United States Patent
Bang

(10) Patent No.: US 10,186,704 B2
(45) Date of Patent: Jan. 22, 2019

(54) BATTERY PACK

(71) Applicant: SAMSUNG SDI CO., LTD., Yongin-si, Gyeonggi-do (KR)

(72) Inventor: Wonkyu Bang, Yongin-si (KR)

(73) Assignee: Samsung SDI Co., Ltd., Yongin-Si, Gyeonggi-do (KR)

( * ) Notice: Subject to any disclaimer, the term of this patent is extended or adjusted under 35 U.S.C. 154(b) by 436 days.

(21) Appl. No.: 14/953,815

(22) Filed: Nov. 30, 2015

(65) Prior Publication Data

US 2017/0040575 A1 Feb. 9, 2017

(30) Foreign Application Priority Data

Aug. 7, 2015 (KR) ........................ 10-2015-0111562

(51) Int. Cl.
*H01M 2/02* (2006.01)
*H01M 2/36* (2006.01)
*H01M 2/04* (2006.01)
*H01M 2/20* (2006.01)
*H01M 2/12* (2006.01)
*H01M 2/30* (2006.01)
H01M 2/08 (2006.01)

(52) U.S. Cl.
CPC ......... *H01M 2/362* (2013.01); *H01M 2/0242* (2013.01); *H01M 2/0262* (2013.01); *H01M 2/0277* (2013.01); *H01M 2/0434* (2013.01); *H01M 2/0482* (2013.01); *H01M 2/1241* (2013.01); *H01M 2/206* (2013.01); *H01M 2/305* (2013.01); *H01M 2/04* (2013.01); *H01M 2/0473* (2013.01); *H01M 2/08* (2013.01); *H01M 2220/20* (2013.01)

(58) Field of Classification Search
None
See application file for complete search history.

(56) References Cited

U.S. PATENT DOCUMENTS

| 8,216,713 | B2 | 7/2012 | Yoon | |
|---|---|---|---|---|
| 8,372,536 | B2 | 2/2013 | Han et al. | |
| 2012/0156548 | A1* | 6/2012 | Kim | H01M 2/0237 429/158 |
| 2012/0301747 | A1* | 11/2012 | Han | H01M 2/1005 429/7 |
| 2013/0040178 | A1* | 2/2013 | Lim | H01M 2/0242 429/94 |

(Continued)

FOREIGN PATENT DOCUMENTS

| EP | 2037513 A1 * | 3/2009 | .......... H01M 2/0242 |
|---|---|---|---|
| KR | 10-2010-0096994 A | 9/2010 | |
| KR | 10-2011-0005595 A | 1/2011 | |

(Continued)

OTHER PUBLICATIONS

Kesper (EP 2037513 A1), abstract translation.*

*Primary Examiner* — Milton I Cano
*Assistant Examiner* — Haixia Zhang
(74) *Attorney, Agent, or Firm* — Lee & Morse, P.C.

(57) ABSTRACT

A battery pack includes a plurality of electrode assemblies, a lower housing including a plurality of receiving parts that receive the plurality of electrode assemblies, an upper cap coupled to a top portion of the lower housing, the upper cap sealing the plurality of receiving parts, and an upper housing combined with the lower housing.

6 Claims, 7 Drawing Sheets

(56) References Cited

U.S. PATENT DOCUMENTS

2014/0186693 A1\* 7/2014 Tyler .................. H01M 2/0262
429/186
2015/0162472 A1\* 6/2015 Iyatani ................ H01L 31/0488
136/251

FOREIGN PATENT DOCUMENTS

KR    10-2012-0132338 A    12/2012
KR    10-2013-0081802 A     7/2013

\* cited by examiner

BATTERY PACK

CROSS-REFERENCE TO RELATED APPLICATION

Korean Patent Application No. 10-2015-0111562, filed on Aug. 7, 2015, in the Korean Intellectual Property Office, and entitled: "Battery Pack," is incorporated by reference herein in its entirety.

BACKGROUND

1. Field

Embodiments relate to a battery pack.

2. Description of the Related Art

In general, a battery pack is mounted as a power supply device on a hybrid vehicle or an electric vehicle capable of being driven by a mutual operation of an engine and a motor. The battery pack includes a plurality of rechargeable battery cells, and a battery housing receiving the plurality of battery cells. The plurality of battery cells may be horizontally stacked and are connected in series to each other.

SUMMARY

Embodiments are directed to a battery pack including a plurality of electrode assemblies, a lower housing including a plurality of receiving parts that receive the plurality of electrode assemblies, an upper cap coupled to a top portion of the lower housing, the upper cap sealing the plurality of receiving parts, and an upper housing combined with the lower housing.

The lower housing and the upper cap may be made of a plastic material. The upper cap and the lower housing may be welded to each other by ultrasonic welding to be integrally coupled with each other.

The lower housing may include a bottom surface, a pair of long side surfaces upwardly extending from the bottom surface and a pair of short side surfaces connecting the pair of long side surfaces. Barriers may be located between each of the plurality of receiving parts, the barriers being parallel to the long side surfaces.

The barriers may include connecting grooves into which electrode tabs of adjacent electrode assemblies are bent and placed.

The pair of long side surfaces may include draw-out grooves into which electrode tabs of the outermost electrode assemblies among the plurality of electrode assemblies are bent and drawn out.

Each of electrode tabs drawn out from the draw-out grooves may include a sealing member. The electrode tabs may be bent upwardly from the draw-out grooves and mounted on the upper cap.

The battery pack may further include electrode terminals combined with and passing through the upper housing, the electrode terminals being electrically connected to the electrode tabs mounted on the upper cap.

The upper cap may include a flat main plate, receiving protrusions that protrude from the main plate and engage with the receiving parts, connecting protrusions that protrude from the main plate and engage with the connecting grooves, and draw-out protrusions that protrude from the main plate and engage with the draw-out grooves.

Each of the receiving protrusions may include an electrolyte injection hole into which an electrolyte is injected and a safety vent having a relatively small thickness.

A top portion of the lower housing may include a stepped portion having a fastening groove. The inner surface of the upper housing may include a fastening protrusion that engages with the fastening groove.

BRIEF DESCRIPTION OF THE DRAWINGS

Features will become apparent to those of skill in the art by describing in detail exemplary embodiments with reference to the attached drawings in which.

DETAILED DESCRIPTION

Figure 1:
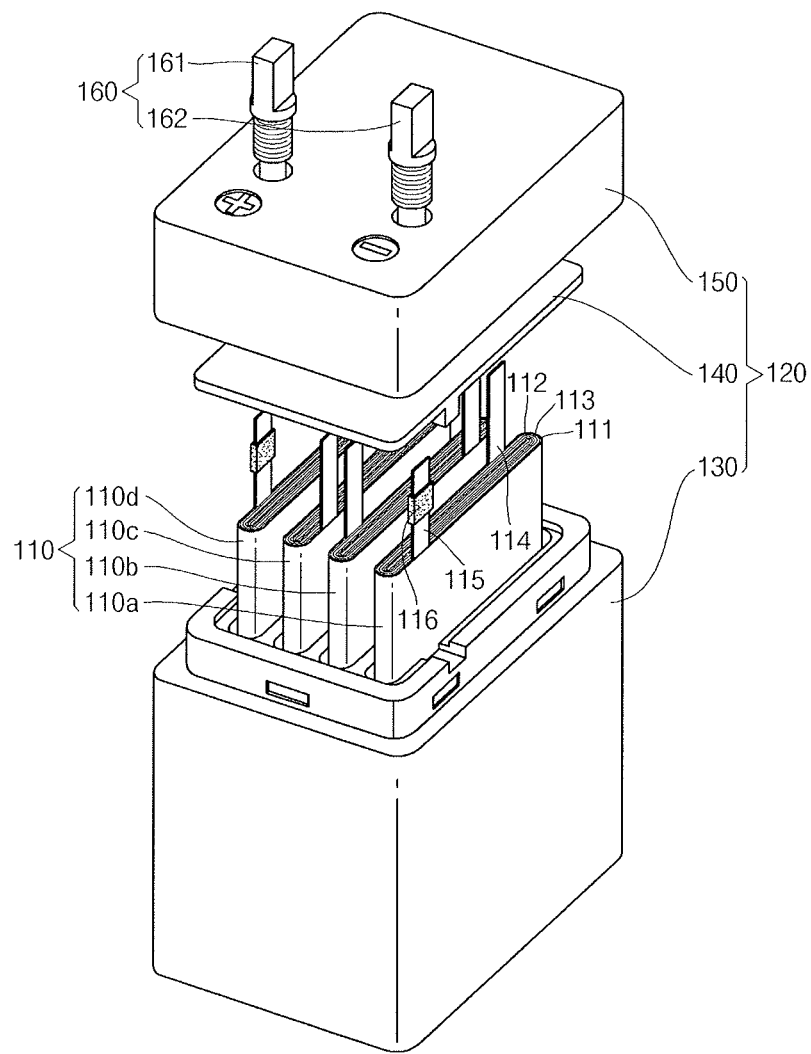
FIG. 1 illustrates an exploded perspective view of a battery pack according to an embodiment.

Example embodiments will now be described more fully hereinafter with reference to the accompanying drawings; however, they may be embodied in different forms and should not be construed as limited to the embodiments set forth herein. Rather, these embodiments are provided so that this disclosure will be thorough and complete, and will fully convey exemplary implementations to those skilled in the art.

In the drawing figures, the dimensions of layers and regions may be exaggerated for clarity of illustration. Like reference numerals refer to like elements throughout.

Figure 2:
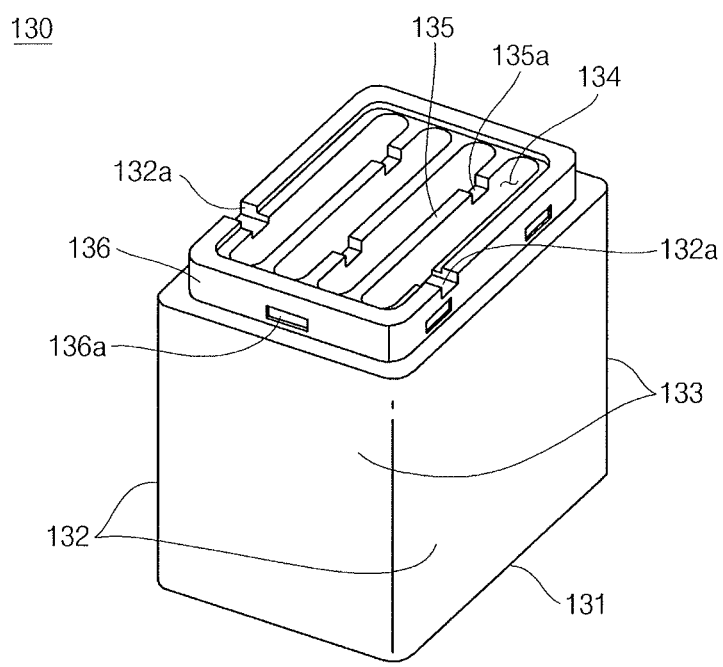
FIG. 2 illustrates a perspective view of a lower housing of FIG. 1.
Figure 3:
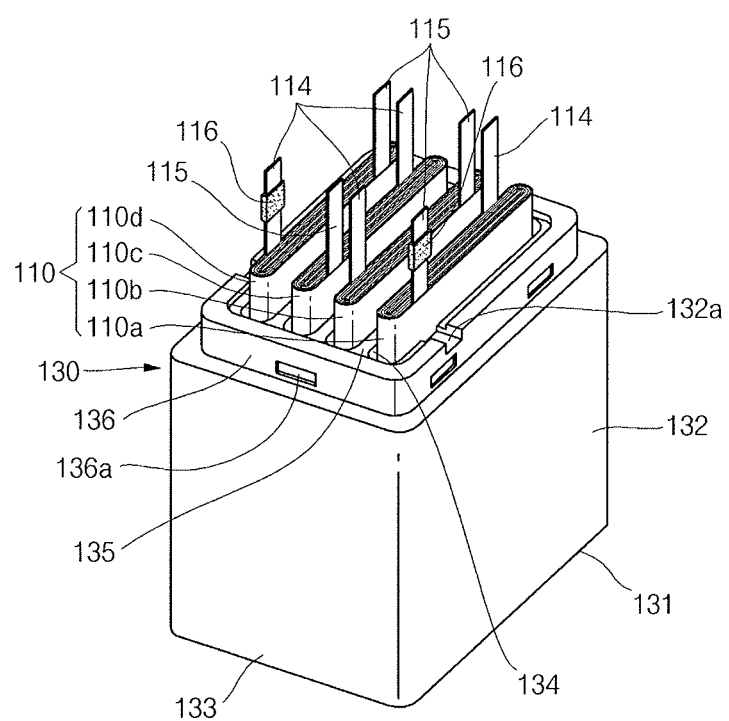
FIG. 3 illustrates a perspective view depicting a state in which an electrode assembly is inserted into the lower housing shown in FIG. 2.
Figure 4:
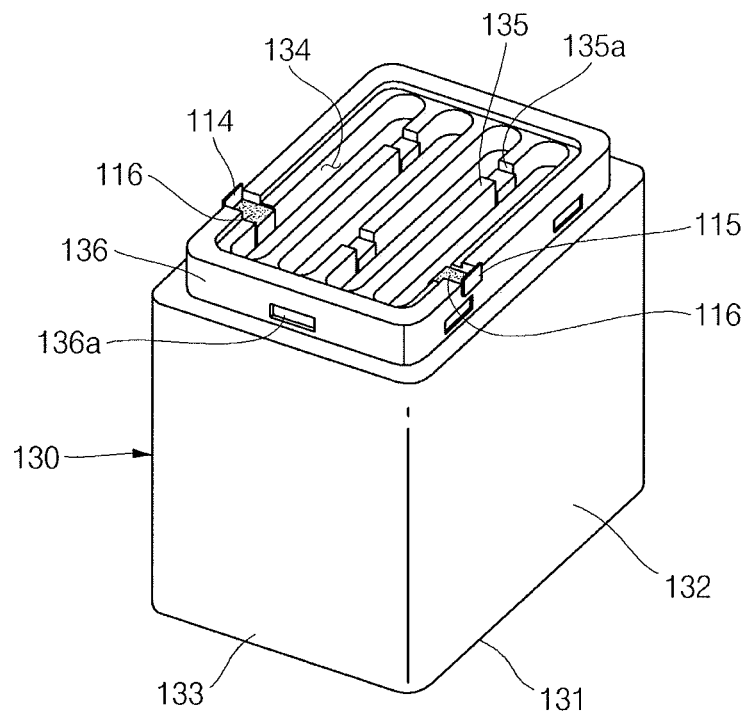
FIG. 4 illustrates a perspective view depicting a state in which electrode tabs of the electrode assembly shown in FIG. 3 are connected to each other.
Figure 5:
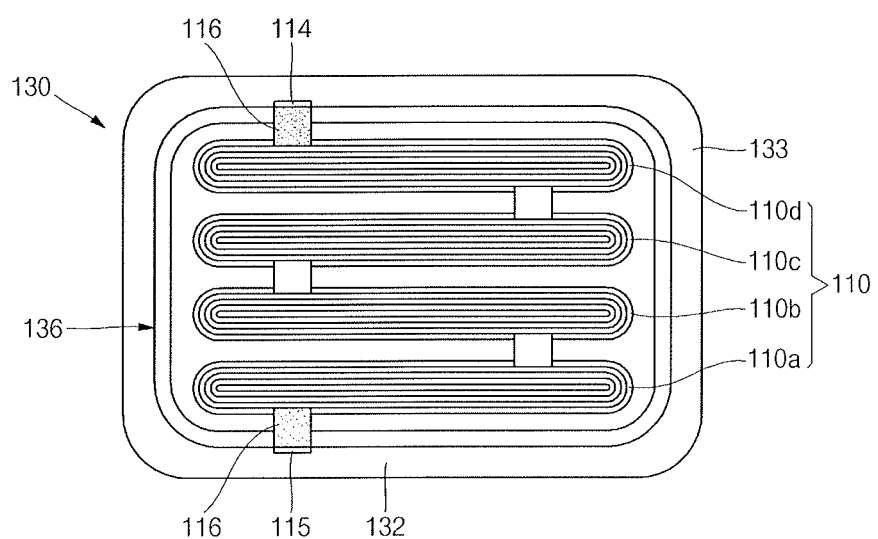
FIG. 5 illustrates a plan view of FIG. 4.
Figure 6:
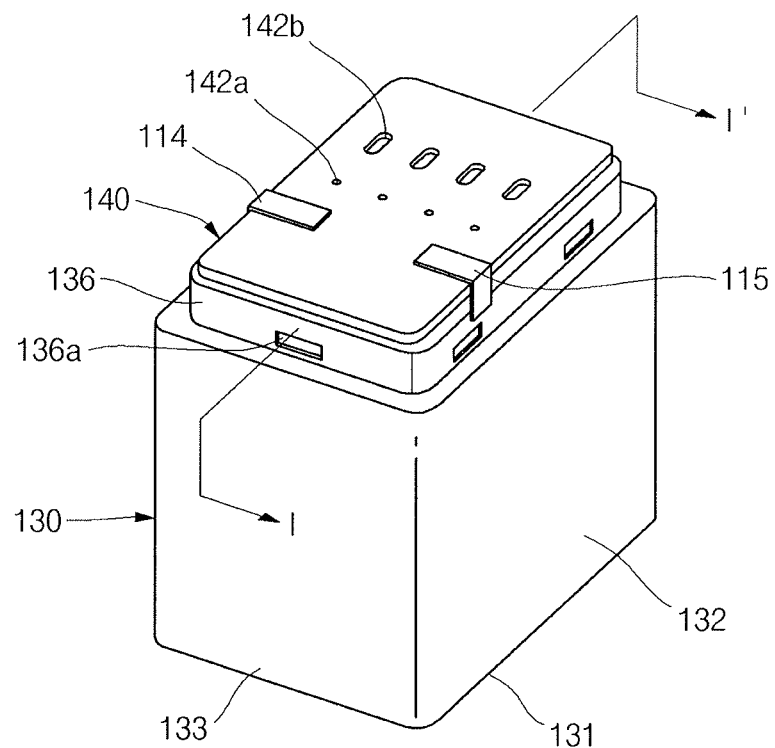
FIG. 6 illustrates a perspective view depicting a state in which an upper cap is combined with the lower housing.
Figure 7:
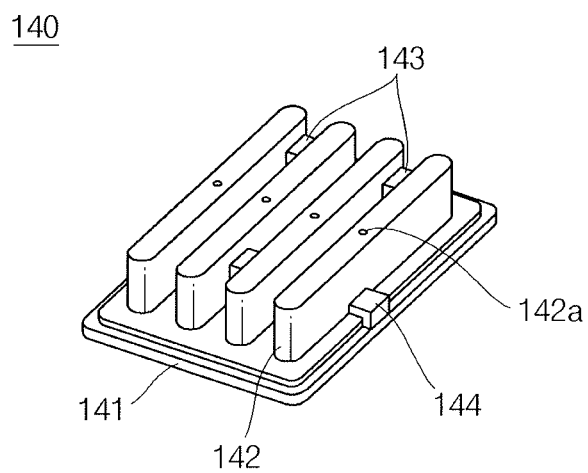
FIG. 7 illustrates a perspective view depicting the upper cap shown in FIG. 6.
Figure 8:
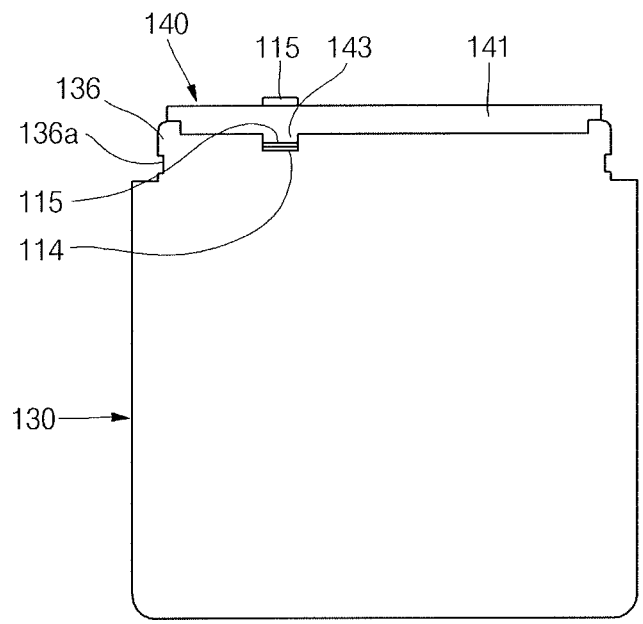
FIG. 8 illustrates a cross-sectional view taken along the line I-I' of FIG. 6.
Figure 9:
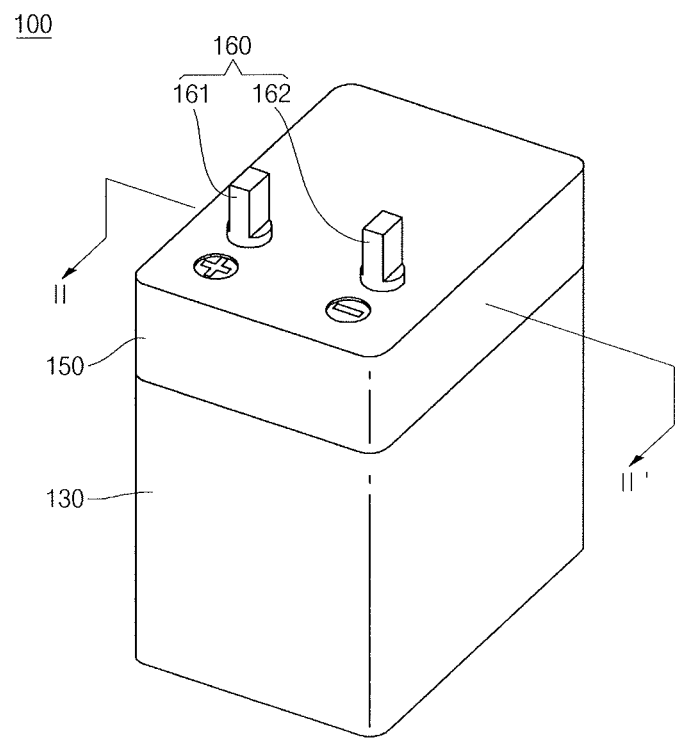
FIG. 9 illustrates a perspective view of a battery pack according to an embodiment.
Figure 10:
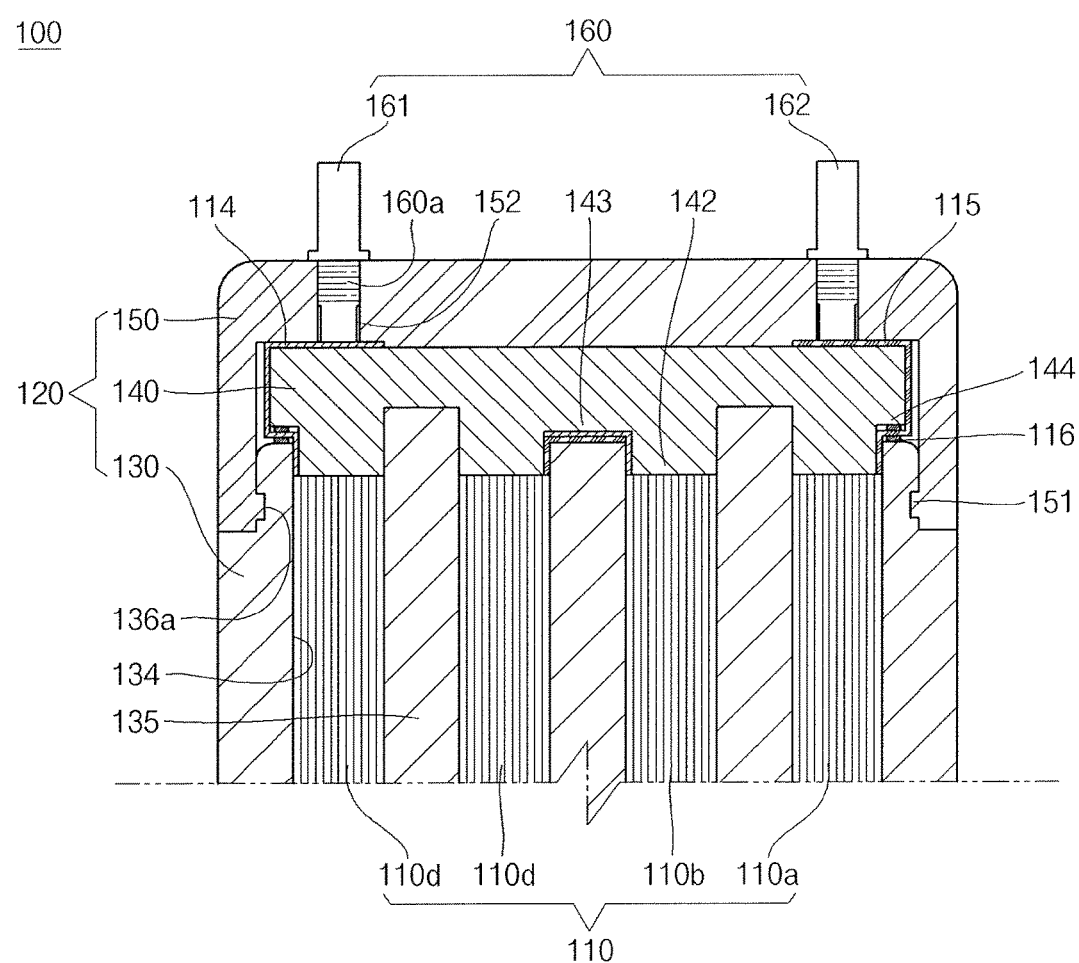
FIG. 10 illustrates a cross-sectional view taken along the line II-II' of FIG. 9.

FIG. 1 illustrates an exploded perspective view of a battery pack according to an embodiment, FIG. 2 illustrates a perspective view of a lower housing of FIG. 1, FIG. 3 illustrates a perspective view depicting a state in which an electrode assembly is inserted into the lower housing shown in FIG. 2, FIG. 4 illustrates a perspective view depicting a state in which electrode tabs of the electrode assembly shown in FIG. 3 are connected to each other. FIG. 5 illustrates a plan view of FIG. 4, FIG. 6 illustrates a perspective view depicting a state in which an upper cap is combined with the lower housing, FIG. 7 illustrates a perspective view depicting the upper cap shown in FIG. 6, FIG. 8 illustrates a cross-sectional view taken along the line I-I' of FIG. 6, FIG. 9 illustrates a perspective view of a battery pack according to an embodiment, and FIG. 10 illustrates a cross-sectional view taken along the line II-II' of FIG. 9.

Referring to FIGS. 1 to 10, the battery pack 100 according to an embodiment may include a plurality of electrode assemblies 110, a housing 120 and electrode terminals 160.

Each of the electrode assemblies 110 may be formed by winding or laminating a stacked structure including a first electrode plate 111, a separator 113 and a second electrode plate 112. The first electrode plate 111 may be a positive electrode plate and the second electrode plate 112 may be a negative electrode plate, as examples. A first electrode tab 114 may be electrically connected to the first electrode plate 111 and may protrude upwardly from each of the electrode assemblies 110. A second electrode tab 115 may be electrically connected to the second electrode plate 112 and may protrude upwardly from each of the electrode assemblies 110. A sealing member 116 may be formed at the first electrode tab 114 or the second electrode tab 115 of the outermost electrode assembly among the plurality of electrode assemblies 110.

The plurality of electrode assemblies 110 may be accommodated in the housing 120 to then be connected to each other in series, thereby constituting a single battery pack 100. Referring to FIG. 1, four electrode assemblies accommodated in the housing 120 and constituting the single battery pack 100 are illustrated, but the single battery pack 100 may include more than or fewer than the four electrode assemblies 110. For convenience of description, the plurality of electrode assemblies 110 may be defined in turn as a first electrode assembly 110*a*, a second electrode assembly 110*b*, a third electrode assembly 110*c*, and a fourth electrode assembly 110*d*.

The housing 120 may include a lower housing 130 accommodating the electrode assemblies 110, an upper cap 140 sealing the top portion of the lower housing 130, and an upper housing 150 combined with the lower housing 130. The housing 120 may be made of a plastic material. The lower housing 130 and the upper cap 140 of the housing 120 may be integrally coupled with each other by ultrasonic welding. The housing 120 may be made of polypropylene (PP), polycarbonate (PC), polyethylene (PE), or polyethylene terephthalate (PET), as examples.

The lower housing 130 may have a substantially hexahedral shape having a top opening through which the plurality of electrode assemblies 110 are inserted and placed. The lower housing 130 may include a bottom surface 131, a pair of long side surfaces 132 upwardly extending from the bottom surface 131 and a pair of short side surfaces 133 connecting the pair of long side surfaces 132. The lower housing 130 may include a plurality of receiving parts 134 accommodating the plurality of electrode assemblies 110, and barriers 135 between each of the plurality of receiving parts 134.

The receiving parts 134 may be shaped to correspond to the shape of the electrode assemblies 110 so as to accommodate the electrode assemblies 110. The receiving parts 134 are plurally formed in the lower housing 130 to be parallel with long sides of the electrode assemblies 110. The first and second electrode tabs 114 and 115 of the electrode assemblies 110 may protrude upwardly from the receiving parts 134. The plurality of electrode assemblies 110 may be accommodated to be connected to each other in series. For example, the first electrode tab 114 of the first electrode assembly 110*a* and the second electrode tab 115 of the second electrode assembly 110*b* may face each other. Likewise, the plurality of electrode assemblies 110 may be accommodated such that the first electrode tab 114 of the second electrode assembly 110*b* and the second electrode tab 115 of the third electrode assembly 110*c* face each other, and the first electrode tab 114 of the third electrode assembly 110*c* and the second electrode tab 115 of the fourth electrode assembly 110*d* face each other. In addition, the second electrode tab 115 of the first electrode assembly 110*a* and the first electrode tab 114 of the fourth electrode assembly 110*d* may be drawn out to then be electrically connected to the electrode terminals 160 of the battery pack 100.

The barriers 135 may be formed to be parallel with the pair of long side surfaces 132 of the lower housing 130. Connecting grooves 135*a* may be formed in the barriers 135. The electrode tabs 114 and 115 of adjacent electrode assemblies 110 may be bent and placed in the connecting grooves 135*a* and electrically connected each other. The connecting grooves 135*a* may be alternately formed in the adjacent barriers 135 in such a manner that the plurality of electrode assemblies 110 are connected to each other in series. For example, one of the connecting grooves 135*a* may be formed at a portion of the barrier 135 between the first electrode assembly 110*a* and the second electrode assembly 110*b*, where the second electrode tab 115 of the second electrode assembly 110*b* is positioned, and another one of the connecting grooves 135*a* may be formed at a portion of the barrier 135 between the second electrode assembly 110*b* and the third electrode assembly 110*c*, where the first electrode tab 114 of the second electrode assembly 110*b* is positioned. As illustrated in FIG. 4, adjacent electrode tabs 114 and 115 having different polarities may be bent and placed in the connecting grooves 135*a*. The electrode tabs 114 and 115 may be electrically connected to each other by ultrasonic welding, laser welding or spot welding.

Draw-out grooves 132*a* may be formed in the pair of long side surfaces 132 of the lower housing 130. For example, the pair of long side surfaces 132 may be parallel with the barriers 135. The pair of long side surfaces 132 may contact the first electrode assembly 110*a* and the fourth electrode assembly 110*d*, which are the outermost electrode assemblies among the plurality of electrode assemblies 110. The second electrode tab 115 of the first electrode assembly 110*a* and the first electrode tab 114 of the fourth electrode assembly 110*d* may be drawn out through the draw-out grooves 132*a*. The sealing member 116 may be formed on the second electrode tab 115 of the first electrode assembly 110*a* and the first electrode tab 114 of the fourth electrode assembly 110*d*, which are drawn out through the draw-out grooves 132*a*. The sealing members 116, positioned between each of the electrode tabs 114 and 115 and the draw-out grooves 132*a*, may prevent the electrolyte injected into the receiving parts 134 from leaking out. In addition, the sealing members 116 prevent external moisture from being induced into the receiving parts 134. The sealing members 116 may be formed of insulating adhesive tapes.

A stepped portion 136 may be formed at a top portion of the lower housing 130, and the upper housing 150 may be combined with the lower housing 130. The term "stepped portion 136" refers to a portion having a step difference formed such that top portions of the pair of long side surfaces 132 and the pair of short side surfaces 133 of the lower housing 130 are recessed toward the receiving parts 134. A fastening groove 136*a* may be formed in the stepped portion 136 and a fastening protrusion 151 of the upper housing 150 may be engaged with the fastening groove 136*a*. Accordingly, the upper housing 150 may be coupled to the top portion of the lower housing 130.

The upper cap 140 may be coupled to the top portion of the lower housing 130 to seal the receiving parts 134. The upper cap 140 may be shaped as a substantially rectangular plate and may be made of a plastic material, like the lower housing 130.

The upper cap 140 may include a main plate 141, and a plurality of receiving protrusions 142, a plurality of connecting protrusions 143 and a plurality of draw-out protrusions 144, formed on a bottom surface of the main plate 140.

The receiving protrusions 142 may be located to correspond to the receiving parts 134 and may be coupled to top portions of the receiving parts 134 to seal the receiving parts 134. In order to seal the receiving parts 134, the receiving protrusions 142 may have elliptical sections, like the receiving parts 134. The connecting protrusions 143 may be located to correspond to the connecting grooves 135a and may be coupled to the connecting grooves 135a to fix the electrode tabs 114 and 115 mounted in the connecting grooves 135a. The connecting protrusions 143 may be formed to have smaller heights than the receiving protrusions 142. The draw-out protrusions 144 may be located to correspond to the draw-out grooves 132a. The draw-out protrusions 144 may be coupled to the draw-out grooves 132a to fix the electrode tabs 114 and 115 drawn out through the draw-out grooves 132a. The sealing members 116 may be located between the draw-out grooves 132a and the draw-out protrusions 144.

An electrolyte injection hole 142a and a safety vent 142b may be formed in each of the receiving protrusions 142. After the upper cap 140 is coupled to the lower housing 130, the electrolyte may be injected into each of the receiving parts 134 through the electrolyte injection hole 142a. In addition, after the electrolyte is injected, the electrolyte injection hole 142a may be sealed by a plug.

The safety vent 142b may have a smaller thickness than each of the receiving protrusions 142. Accordingly, the safety vent 142b may be ruptured in the event that the internal pressure of a respective one of the receiving parts 134 exceeds a preset pressure, thereby releasing internal gases.

The upper cap 140 may be welded to the top portion of the lower housing 130 by ultrasonic welding. The ultrasonic welding may be performed on a portion of the upper cap 140, except for the receiving protrusions 142 and the connecting protrusions 143. The upper cap 140 may be formed of the same material as the lower housing 130. Accordingly, the upper cap 140 may be integrally coupled with the lower housing 130 by ultrasonic welding, such that no gap exists between the lower housing 130 and the upper cap 140. Accordingly, it may be possible to prevent the electrolyte from leaking out between the lower housing 130 and the upper cap 140. For example, the electrode tabs 114 and 115 are drawn out between the lower housing 130 and the upper cap 140. If the sealing members 116 were not present, t the electrolyte could leak out between the lower housing 130 and the upper cap 140. However, when the sealing members 116 are formed in the drawn-out electrode tabs 114 and 115 and welded to the lower housing 130 and the upper cap 140 by ultrasonic welding, the sealing members 116 may prevent the electrolyte from leaking out between each of the drawn-out electrode tabs 114 and 115 and the lower housing 130 and upper cap 140. The drawn-out electrode tabs 114 and 115 may be upwardly bent from the upper cap 140 to then be mounted on the upper cap 140, for example, on an upper side of the upper cap 140. In some implementations, the drawn-out electrode tabs 114 and 115 may be fixed to the upper cap 140 by an adhesive member.

The upper housing 150 may be combined with the lower housing 130. For example, the upper housing 150 may be coupled to the top portion of the lower housing 130 sealed by the upper cap 140. The fastening protrusion 151 may be formed on the inner surface of the upper housing 150. The fastening protrusion may engage with the fastening groove 136a of the lower housing 130. For example, the fastening protrusion 151 may engage with the fastening groove 136a of the lower housing 130 such that the upper housing 150 is combined with the lower housing 130.

The electrode terminals 160 may pass through the upper housing 150 to be electrically connected to the electrode tabs 114 and 115, which are drawn out between the lower housing 130 and the upper cap 140 and mounted on the top portion of the upper cap 140. The electrode terminals 160 may include a first electrode terminal 161 and a second electrode terminal 162. The first electrode terminal 161 may be electrically connected to the first electrode tab 114 of the fourth electrode assembly 110d and may function as a positive electrode. The second electrode terminal 162 may be electrically connected to the second electrode tab 115 of the first electrode assembly 110a and may function as a negative electrode. A terminal hole 152 may be formed in the upper housing 150 with respect to each of the electrode terminals 160. In addition, a thread 160a may be formed in each of the electrode terminals 160 to couple the electrode terminals to the upper housing 150 in the terminal hole 152 such that the electrode terminals 160 are fixed to the upper housing 150.

By way of summation and review, in a general battery pack, battery cells each having an electrode assembly primarily housed with a case are accommodated in a battery housing to then be secondarily housed. Such a battery pack requires multiple components and multiple process steps, resulting in an increased cost.

As described above, the battery pack 100 according to an embodiment includes the plurality of receiving parts 134 and is formed by inserting the plurality of electrode assemblies 110 into the lower housing 130 made of a plastic material and welding the upper cap 140 made of a plastic material to the top portion of the lower housing 130 by ultrasonic welding. Accordingly, the battery pack 100 according to an embodiment may prevent the electrolyte injected into the receiving parts 134 from leaking out or external moisture from being induced into the receiving parts 134, thereby improving safety of the battery pack 100.

In addition, in the battery pack 100 according to an embodiment, since the plurality of electrode assemblies 110 are directly inserted into the housing 120, the number of components can be reduced, thereby reducing costs.

Example embodiments have been disclosed herein, and although specific terms are employed, they are used and are to be interpreted in a generic and descriptive sense only and not for purpose of limitation. Accordingly, it will be understood by those of skill in the art that various changes in form and details may be made without departing from the spirit and scope thereof as set forth in the following claims.

What is claimed is:
1. A battery pack, comprising:
a plurality of electrode assemblies;
a lower housing including a bottom surface, a pair of long side surfaces upwardly extending from the bottom surface and a pair of short side surfaces connecting the pair of long side surfaces, the lower housing including a plurality of receiving parts that receive the plurality of electrode assemblies and barriers located between each of the plurality of receiving parts, the barriers being parallel to the long side surfaces, the barriers including connecting grooves into which electrode tabs of adjacent electrode assemblies among the plurality of electrode assemblies are bent and placed and the pair of long side surfaces include draw-out grooves into which electrode tabs of outermost electrode assemblies among the plurality of electrode assemblies are bent and drawn out;

an upper cap coupled to a top portion of the lower housing, the upper cap sealing the plurality of receiving parts, wherein the upper cap includes:

a flat main plate including a bottom surface;

receiving protrusions that protrude from the bottom surface of the main plate and engage with the receiving parts;

connecting protrusions that protrude from the bottom surface the main plate and engage with the connecting grooves; and draw-out protrusions that protrude from the bottom surface of the main plate and engage with the draw-out grooves; and an upper housing combined with the lower housing.

2. The battery pack as claimed in claim 1, wherein:

the lower housing and the upper cap are made of a plastic material, and the upper cap and the lower housing are welded to each other by ultrasonic welding to be integrally coupled with each other.

3. The battery pack as claimed in claim 1, wherein:

each of the electrode tabs of the outermost electrode assemblies drawn out from the draw-out grooves includes a sealing member, and the each of the electrode tabs of the outermost electrode assemblies are bent upwardly from the draw-out grooves and are mounted on the upper cap.

4. The battery pack as claimed in claim 3, further comprising electrode terminals combined with and passing through the upper housing, the electrode terminals being electrically connected to the electrode tabs mounted on the upper cap.

5. The battery pack as claimed in claim 1, wherein each of the receiving protrusions includes an electrolyte injection hole into which an electrolyte is injected and a safety vent.

6. The battery pack as claimed in claim 1, wherein:

the top portion of the lower housing includes a stepped portion having a fastening groove, and an inner surface of the upper housing includes a fastening protrusion that engages with the fastening groove.

* * * * *